United States Patent
Honma

[11] Patent Number: 5,917,794
[45] Date of Patent: Jun. 29, 1999

[54] INFORMATION DETECTING DEVICE HAVING CIRCUIT CAPABLE OF PROVIDING OPTIMUM AGC OPERATION

[75] Inventor: Hiromi Honma, Tokyo, Japan

[73] Assignee: NEC Corporation, Tokyo, Japan

[21] Appl. No.: 08/925,187

[22] Filed: Sep. 8, 1997

[30] Foreign Application Priority Data

Sep. 6, 1996 [JP] Japan .................................. 8-236951

[51] Int. Cl.$^6$ ....................................................... G11B 7/00
[52] U.S. Cl. .............................................................. 369/59
[58] Field of Search ................................ 369/59, 48, 47, 369/124

[56] References Cited

U.S. PATENT DOCUMENTS

| | | | |
|---|---|---|---|
| 5,598,392 | 8/1994 | Izumi et al. | 369/59 |
| 5,604,724 | 9/1995 | Shiokawa | 369/59 |
| 5,680,380 | 9/1994 | Taguchi et al. | 369/59 |
| 5,684,773 | 3/1996 | Hayashi | 369/59 |

FOREIGN PATENT DOCUMENTS 2-240868  9/1990  Japan .

OTHER PUBLICATIONS

Andrew J. Viterbi, "Convolutional Codes and Their Performance in Communication Systems", *IEEE Transactions on Communications Technology*, vol. COM–19, No. 5, Oct. 1971, pp. 751–772.

Primary Examiner—Nabil Hindi
Attorney, Agent, or Firm—Sughrue, Mion, Zinn, Macpeak & Seas, PLLC

[57] ABSTRACT

An information detecting device comprises a multiplier for multiplying a gain g by a reproduced digital signal reproduced out of an optical recording medium to produce a multiplication result. A maximum likelihood detector is for use in carrying out, in response to the multiplication result, pulsing operation according to the multiplication result to produce a pulse string. A replica generator is for use in producing, in response to the pulse string, a replica waveform having an ideal channel property out of the pulse string. A delay circuit is for use in producing, in response to the reproduced digital signal, a delayed signal having the same phase as the replica waveform. An amplitude fluctuation amount detector detects, in response to the replica waveform and the delayed signal, a fluctuation amount of the amplitude of the reproduced digital signal by means of comparing the replica waveform with the delayed signal and supplies a signal designating the gain g to the multiplier in accordance with a detected fluctuation amount.

17 Claims, 16 Drawing Sheets

INFORMATION DETECTING DEVICE HAVING CIRCUIT CAPABLE OF PROVIDING OPTIMUM AGC OPERATION

BACKGROUND OF THE INVENTION

The present invention relates to an information detecting device for use in reproducing information recorded at high density on a recording medium. More specifically, the present invention relates to an information detecting device for use in reproducing information recorded optically on a recording medium.

High-density file devices of a large capacity have recently been provided on the market such as optical disk devices represented by digital video disks (DVDs) and magnetic disk devices. Signal processing technique capable of reproducing information in a highly reliable manner would be indispensable to realize recording at high density in such file devices. In particular, file devices have been commercialized in succession that uses a partial response maximum likelihood (PRML) technique. The PRML technique is a combination of partial response waveform equalization and maximum likelihood detection. As is well known in the art, this technique corrects a reproduced signal with the waveform equalization and then carries out the maximum likelihood detection in order to best bring out the properties of the maximum likelihood detector, taking reproduction channels into consideration.

Both the optical and magnetic disk devices are suffered from significant intersymbol interference when information recorded thereon at high density is to be reproduced, which decreases reproduction amplitude. This means that a signal noise ratio (SNR) becomes smaller to raise an error rate of detected information. The maximum likelihood detection uses properties of the reproduction channel that has a certain state transition for information detection. It selects time-series patterns having an minimum mean square of errors from all probable time-series patterns that are expected from the properties of the reproduction channel for a four-bit amplitude information series, for example, supplied to the maximum likelihood detector. This allows detection of information at a lower error rate even with a small SNR.

However, the above-mentioned operation is not easy when implemented in a circuit in practice. In this respect, an algorithm called a Viterbi algorithm described in, "IEEE Transaction on Communication, Vol. COM-19, October, 1971, is typically used to select paths recurrently to reproduce information.

Data are recorded on common file devices at the same density for different radial locations in a disk in view of making good use of a limited recording area. More specifically, it is possible to reduce a scale of detection circuit with a detection circuit inherent to the reproduction channel when the PRML detection is performed because the reproduction channel has about the same properties. However, detection capability is significantly deteriorated due to a change in amplitude of an input signal because it complies with fixed channels.

Typical detection techniques add an automatic gain control (AGC) circuit that follow-ups a gain of an amplifier to ensure a constant amplitude of the reproduced signal even when the input signal is fluctuated in amplitude.

However, as will be apparent later, the conventional AGC circuits used for the file device are analogized and are thus not suitable for miniaturization.

SUMMARY OF THE INVENTION

Therefore, an object of the present invention is to provide an information detecting device having a circuit that is capable of providing optimum AGC operation.

Another object of the present invention is to provide an information detecting device that is capable of providing a smaller circuit.

An information detecting device according to the first invention is characterized by comprising a multiplier for multiplying a gain g by a reproduced digital signal reproduced out of an optical recording medium to produce a multiplication result; maximum likelihood detection means for use in carrying out, in response to the multiplication result, pulsing operation according to the multiplication result to produce a pulse string; replica generating means for use in producing, in response to the pulse string, a replica waveform having an ideal channel property out of the pulse string; a delay circuit for use in producing, in response to the reproduced digital signal, a delayed signal having the same phase as the replica waveform; and amplitude fluctuation amount detection means for detecting, in response to the replica waveform and the delayed signal, a fluctuation amount of the amplitude of the reproduced digital signal by means of comparing the replica waveform with the delayed signal and supplies a signal designating the gain g to the multiplier in accordance with a detected fluctuation amount.

An information detecting device according to the second invention is characterized by comprising a multiplier for multiplying a gain g by a reproduced digital signal reproduced out of an optical recording medium to produce a multiplication result; maximum likelihood detection means for use in carrying out, in response to the multiplication result, pulsing operation according to the multiplication result to produce a pulse string; replica generating means for use in producing, in response to the pulse string, a replica waveform having an ideal channel property out of the pulse string; a delay circuit for use in producing, in response to the multiplication result, a delayed signal having the same phase as the replica waveform; and amplitude fluctuation amount detection means for detecting, in response to the replica waveform and the delayed signal, a fluctuation amount of the amplitude of the reproduced digital signal by means of comparing the replica waveform with the delayed signal and supplies a signal designating the gain g to the multiplier in accordance with a detected fluctuation amount.

An information detecting device according to the third invention comprises a multiplier for multiplying a gain g by a reproduced digital signal reproduced out of an optical recording medium to produce a multiplication result; and maximum likelihood detection means for use in carrying out, in response to the multiplication result, pulsing operation according to the multiplication result to produce a pulse string. The maximum likelihood detection means can switch channel properties. The information detecting device also comprises replica generating means for use in producing, in response to the pulse string, a replica waveform having an ideal channel property out of the pulse string. The replica generating means can switch the channel properties. The information detecting device also comprises a delay circuit for use in producing, in response to the reproduced digital signal, a delayed signal having the same phase as the replica waveform; and amplitude fluctuation amount detection means for detecting, in response to the replica waveform and the delayed signal, a fluctuation amount of the amplitude of the reproduced digital signal by means of comparing the replica waveform with the delayed signal and supplies a signal designating the gain g to the multiplier in accordance with a detected fluctuation amount. The maximum likelihood detection means and the replica generating means can change the channel properties at the same time by a control signal from a system controller.

DESCRIPTION OF THE PREFERRED EMBODIMENTS

Figure 1:
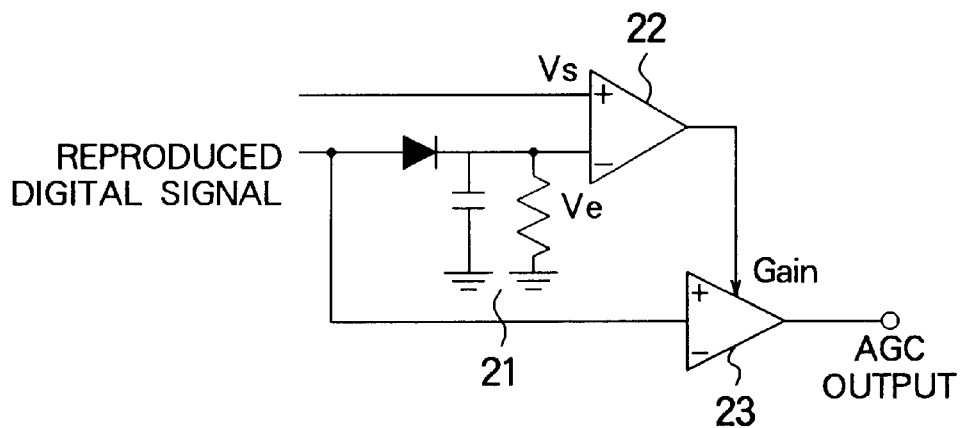
FIG. 1 is a block diagram showing an example of a conventional AGC circuit.
Figure 2:
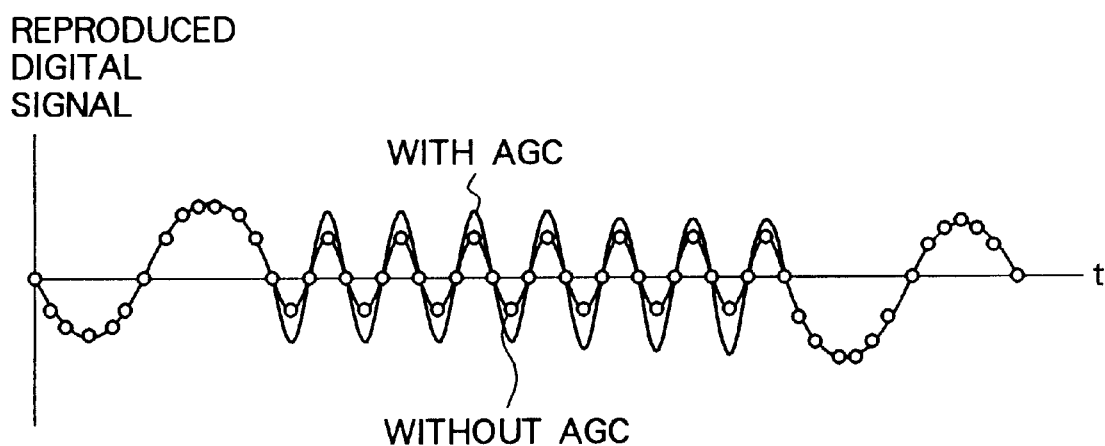
FIG. 2 is a signal waveform for use in describing operation of the AGC circuit illustrated in FIG. 1.

A conventional automatic gain control (AGC) circuit is described with reference to FIGS. 1 and 2 for the purpose of facilitating the understanding of the present invention. In FIG. 1, the AGC circuit comprises a CR circuit 21, a differential amplifier 22, and an AGC amplifier 23. The AGC circuit is used for an information detecting device to reproduce information with an optical head out of a recording medium such as an optical disk. The AGC circuit is for the follow-up of a gain of an amplifier to ensure a constant amplitude of a reproduced signal even when an input signal is fluctuated in amplitude. More specifically, the CR circuit 21 detects an envelope level Ve of the reproduced signal. The differential amplifier 22 detects a difference in level between a reference amplitude level Vs and the envelope level Ve. The differential amplifier 22 controls a gain of the AGC amplifier 23 according to the level difference. This configuration allows the reproduced signal having no fluctuation of amplitude by means of increasing the gain of the AGC amplifier 23 even when an output level from the optical head decreases and in turn an amplitude level of the reproduced signal is decreased. The above-mentioned circuit typically is used as a combination with a Viterbi detector.

There is, however, a problem when the detection should be made based on the maximum likelihood detection because of a low resolution of the reproduced signal. As shown in FIG. 2, the amplitude becomes small due to intersymbol interference when the reproduced signal has continuing recording patterns having a high frequency component(s). In this event, the AGC circuit detects that the reproduced signal has a lower level and increases the gain of the AGC amplifier 23. Such increase of the gain leads amplification of a signal that otherwise should have a small amplitude, considering original overlap of solitary waveforms. As a result, a non-linear waveform is supplied to the Viterbi detector, increasing an error rate of it.

An information detecting device having a function to overcome such problems is disclosed in, for example, Japanese Patent Laid-open No. 2-240868. The disclosed information detecting device operates as a magnetic recording and reproducing device. It is described with reference to FIG. 3.

Figure 3:
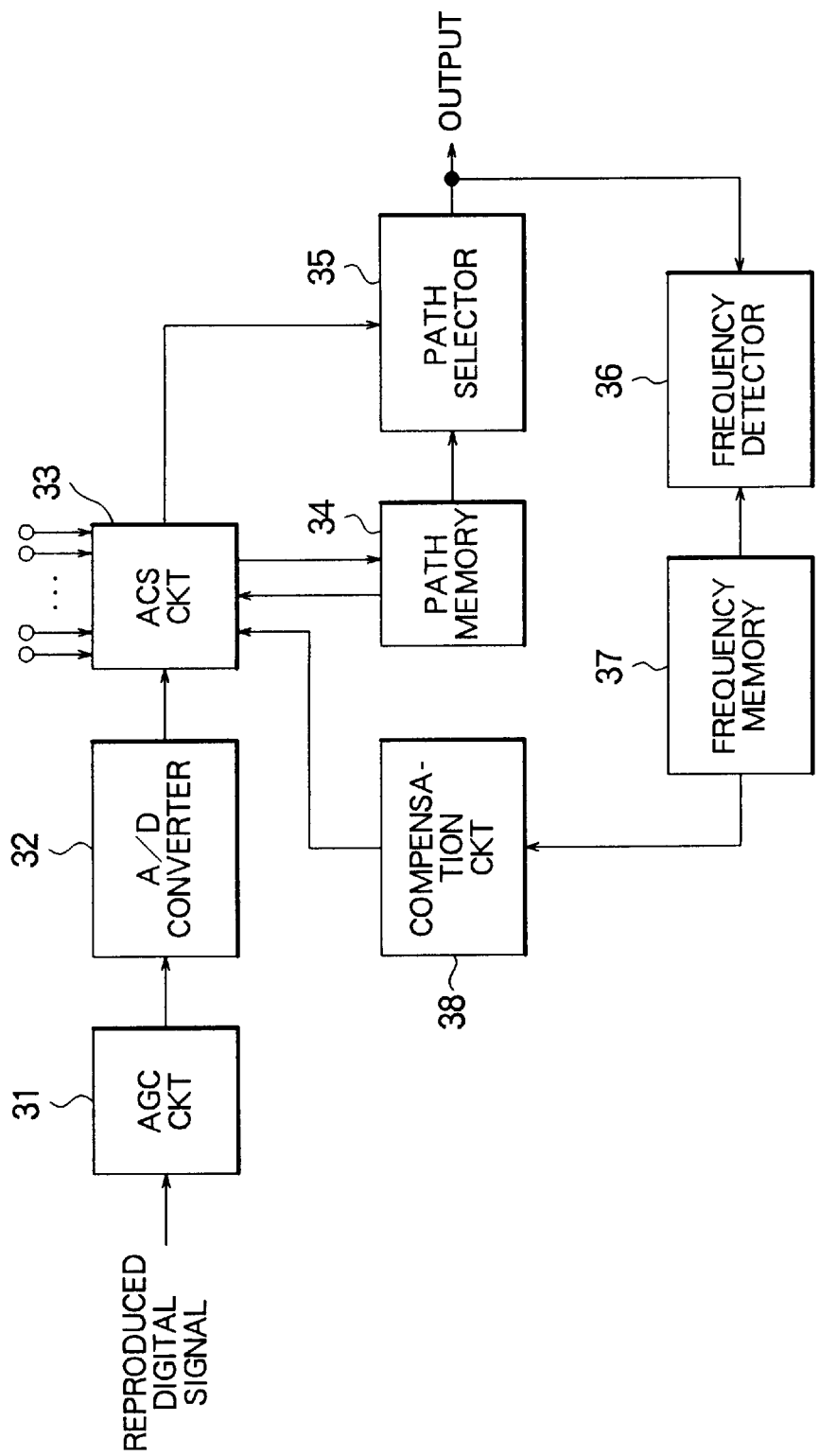
FIG. 3 is a block diagram showing the structure of a conventional magnetic recording and reproducing device.

In FIG. 3, the magnetic recording and reproducing device comprises an AGC circuit 31. An analog-to-digital converter 32 converts an analog reproduced signal obtained from the AGC circuit 31 into a digital format. An addition/comparison/selection circuit (hereinafter, referred to as an ACS circuit) 33 compares a value indicated by an output signal from the A/D converter 32 with an expected value calculated according to the overlap of solitary waveform sample values that are previously obtained. The ACS circuit 33 selects a valid path or paths. The selected valid path is stored in a path memory 34. A path selector 35 selects the most probable path from the outputs of the ACS circuit 33 and the path memory 34. The path selector 35 uses the most probable path as a decoded output for the reproduced signal. A frequency detector 36 detects a frequency of the decoded output supplied from the path selector 35. A detected frequency is stored for a predetermined time in a frequency memory 37. A compensation circuit 38 checks past frequency conversion for the reproduced signal. The compensation circuit 38 compensates an expected sample value to increase the level of the expected value when the frequency is high.

The magnetic recording and reproducing device detects a value (high or low) of the input frequency according to the waveform of the signal after being passed through the AGC circuit 31. The magnetic recording and reproducing device then weights and corrects a branch metric calculation carried out by the Viterbi detector when the frequency is high. The magnetic recording and reproducing device compensates deterioration of the performance of the Viterbi detector that is associated with the AGC circuit 31.

However, the magnetic recording and reproducing device feeds the frequency information detected by the frequency detector 36 back to the branch metric calculation in the ACS circuit 33. Therefore, it cannot be applied to the Viterbi detector for fixed channels. In addition, the Viterbi detector is not the one complying with the fixed channels, so that the Viterbi detector and the ACS circuit have disadvantageously large scale of circuits. Furthermore, the detector is formed of the combination of the conventional AGC circuit and metric calculation compensation. A separate AGC circuit is required along with the Viterbi detector. The analog circuits used for the file device are typically analogized, so that they are not suitable for miniaturization.

Figure 4:
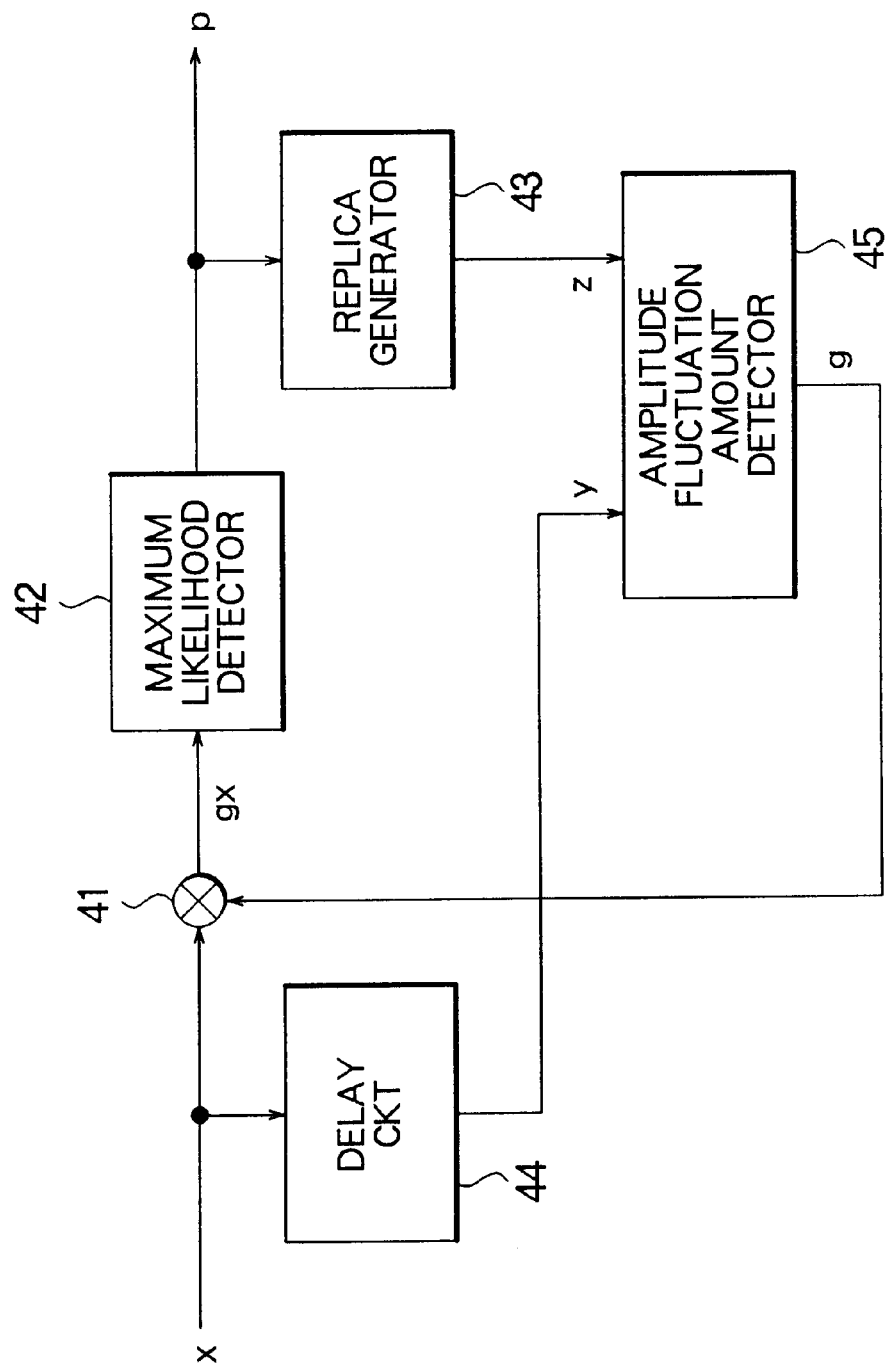
FIG. 4 is a block diagram showing the structure of an information detecting device according to a first embodiment of the present invention.

Referring to FIG. 4, an information detecting device according to a first embodiment of the present invention is described. In FIG. 4, a reproduced digital signal x that is read out of an optical disk is multiplied by a gain g in a multiplier 41. The reproduced digital signal x is thus amplified by g times and is supplied to a maximum likelihood detector 42. The maximum likelihood detector 42 carries out pulsing operation in accordance with a g-time multiplied reproduced signal. The maximum likelihood detector 42 produces a pulse string p indicative of bit information. The bit information is converted into an ideal amplitude information z indicative of a replica waveform by a replica generator 43. The amplitude information z is an ideal input waveform to the maximum likelihood detector 42 even when the input signal supplied to the maximum likelihood detector 42 has a fluctuated amplitude, as long as the maximum likelihood detector 42 produces correct bit information. Comparison between the amplitude information z and the reproduced digital signal x allows detection of the fluctuation amount of the amplitude. To this end, it is necessary to match the phase of the reproduced digital signal x and the amplitude information z. A delayed signal y is previously produced by a delay circuit 44. The delayed signal y is obtained by delaying the reproduced digital signal x. A delay time in the delay circuit 44 is determined uniquely depending on the amount of delay caused due to the maximum likelihood detector 42 and the replica generator 43.

An amplitude fluctuation amount detector 45 detects a fluctuation amount of the waveform of the reproduced digital signal x according to the delayed signal y and the amplitude information z. The amplitude fluctuation amount detector 45 feeds an ideal gain g back to the multiplier 41. This permits AGC operation.

Figure 5:
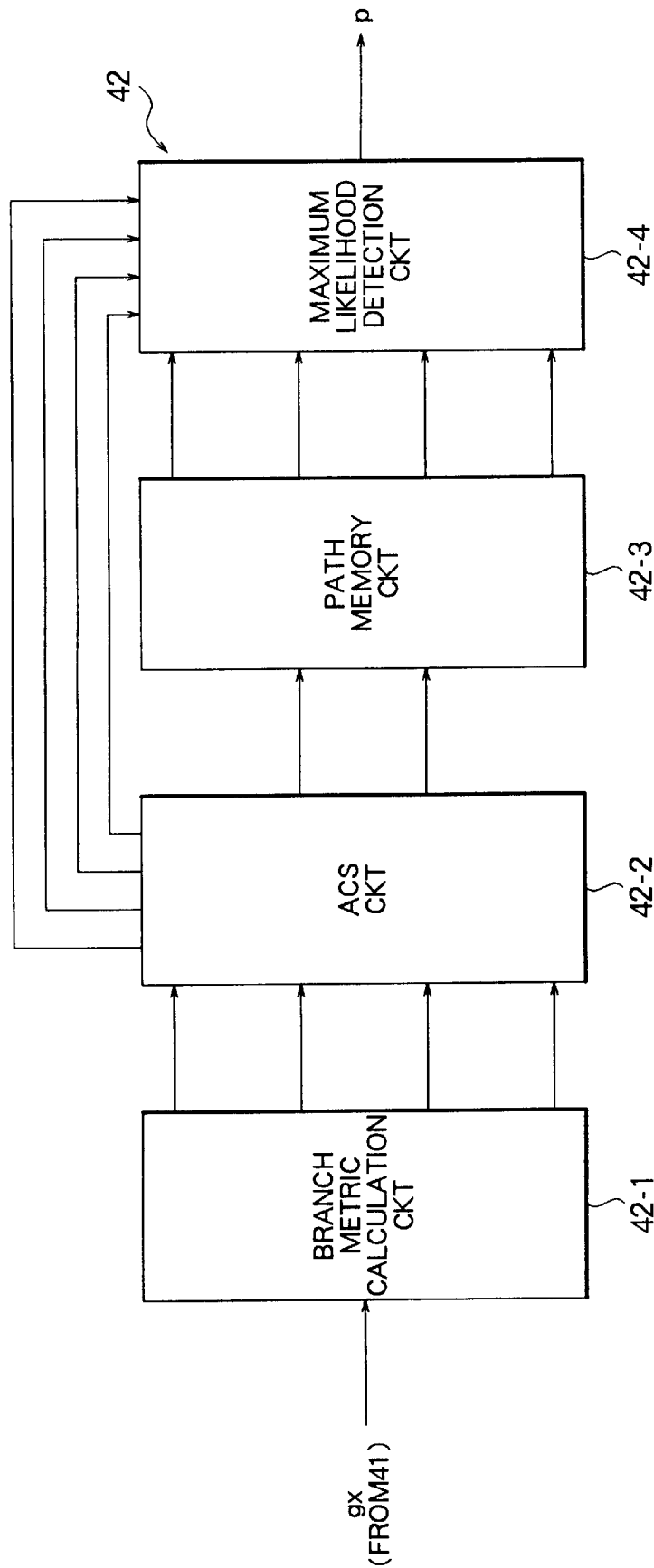
FIG. 5 is a block diagram showing the structure of a maximum likelihood detection section illustrated in FIG. 4.

FIG. 5 is a block diagram showing the structure of the maximum likelihood detector 42 illustrated in FIG. 4. The maximum likelihood detector 42 may be replaced with a level detecting circuit or a peak detecting circuit. However, a Viterbi detector would be the best that is a kind of the maximum likelihood detector having a high detection capability at a low SNR.

In FIG. 5, a branch metric calculation circuit 42-1 receives a g-time multiplied reproduced signal gx and calculates branch metric values corresponding to the respective amplitude levels that are expected for the g-time multiplied reproduced signal gx. An ACS circuit 42-2 adds the calculated branch metric value to a past path metric values. The ACS circuit 42-2 compares the path metric value to select the smaller one. A selected path metric value is stored in a path memory circuit 42-3. A maximum likelihood determination circuit 42-4 selects the path having the maximum likelihood from the values stored in the path memory circuit 42-3 to produce a bit string corresponding to the path having the maximum likelihood.

Figure 6:
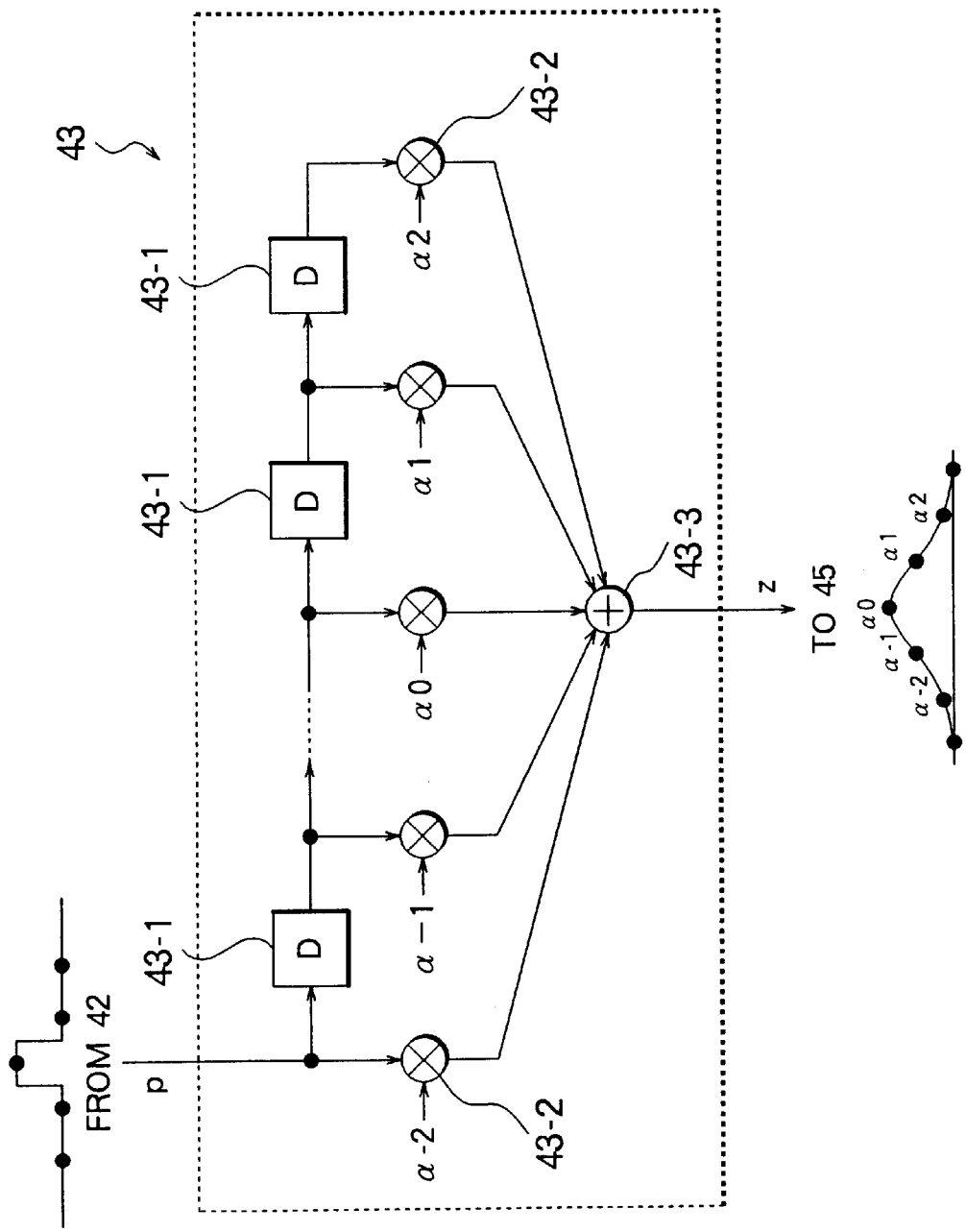
FIG. 6 is a block diagram showing the structure of a replica producing section illustrated in FIG. 4.

FIG. 6 is a block diagram showing the structure of the replica generator 43 illustrated in FIG. 4. In FIG. 6, the replica generator 43 comprises a plurality of shift registers 43-1 that are connected in series to each other, a plurality of multipliers 43-2, and an adder 43-3. Input bit strings p are supplied one by one to the shift registers 43-1. An output signal supplied from each shift register 43-1 is weighted by a weighting coefficient αi by the multipliers 43-2. Multiplication results from the multipliers 43-2 are summed by the adder 43-3. Such configuration can be achieved by using a well-known transversal filter. The weighting coefficient αi is determined previously to provide a channel suitable for the maximum likelihood detector 42 illustrated in FIG. 5.

Figure 7:
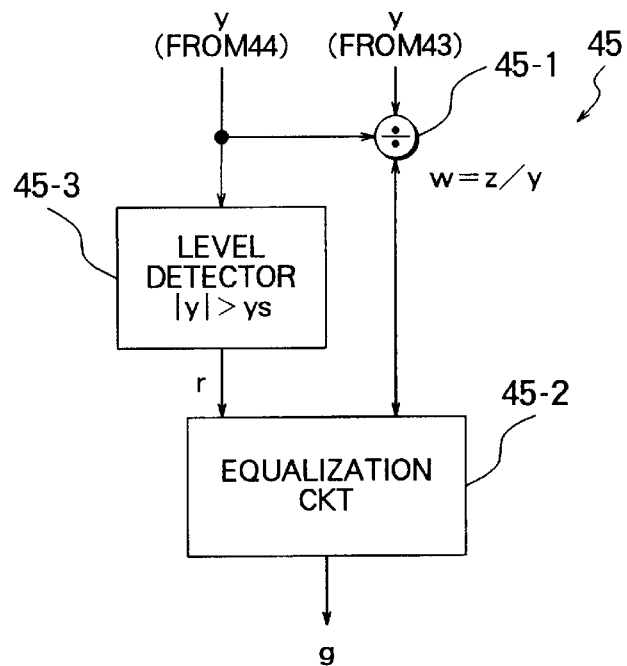
FIG. 7 is a block diagram showing the structure of an amplitude fluctuation amount detection section illustrated in FIG. 4.

FIG. 7 is a block diagram showing the structure of the amplitude fluctuation amount detector 45 illustrated in FIG. 4. In FIG. 7, a divider 45-1 calculates a ratio of the delayed signal y to the amplitude information, i.e., z/y, in response to the delayed signal y from the delay circuit 44 in FIG. 4 and the amplitude information z having the same phase as the delayed signal y. The divider 45-1 produces a division result w as a gain sample value. An equalization circuit 45-2 calculates the gain g of the AGC amplifier by means of equalizing a plurality of division results w. It is noted that the division results w may be distributed when the delayed signal y is close to zero. In order to avoid such distribution, a level detector 45-3 detects whether the absolute value of the delayed signal y is larger than a threshold level. The level detector 45-3 produces a signal r when the absolute value of the delayed signal y is larger than a certain threshold level. The equalization circuit 45-2 equalizes the division result w only when it receives the signal r.

Figure 8:
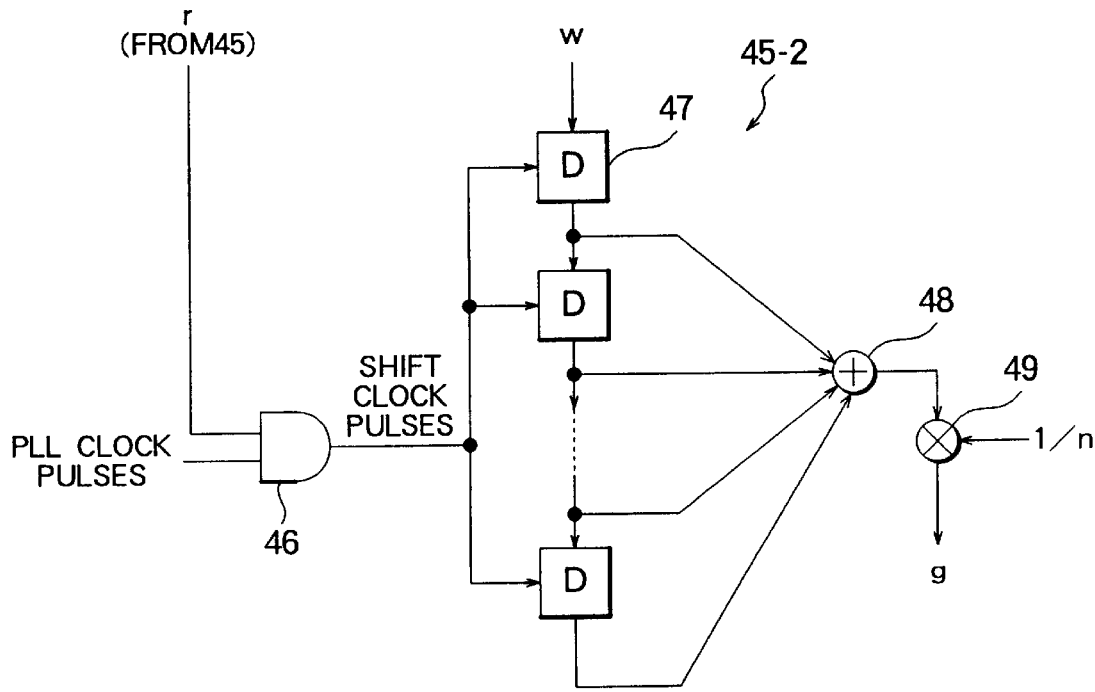
FIG. 8 is a block diagram showing the structure of an equalization circuit illustrated in FIG. 7.

Referring to FIG. 8, the equalization circuit 45-2 comprises an AND gate 46 of which input terminals receive the signal r of the level detector 45-3 and PLL clock pulses. The AND gate 46 produces a shift lock pulse when the signal r of the level detector 45-3 is "high" and one of the PLL clock pulses is received. n number of registers 47 (where n represents a natural number equal to or larger than 2) each updates and holds the gain sample value, i.e., the content of the division results w by the shift clock pulse to transmits it to the register in the adjacent next stage. An adder 48 sums the outputs of the n number of registers 47 to produce an addition result. A multiplier 49 calculates an average value of the n number of gain sample values by means of multiplying the addition result by 1/n.

Figure 9:
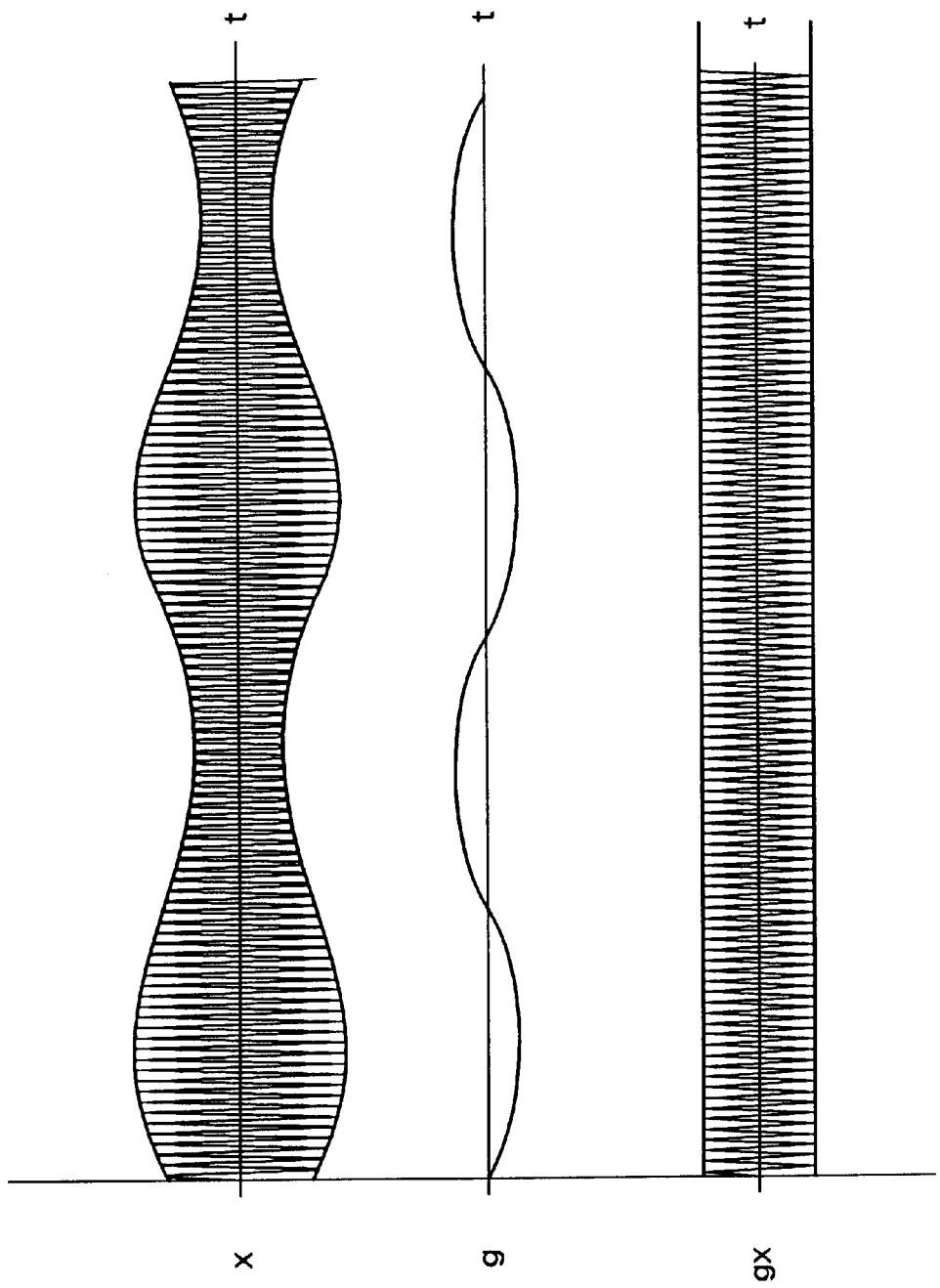
FIG. 9 is a view showing signal waveforms at individual sections for use in describing operation of the information detecting device illustrated in FIG. 4.

Operation of the first embodiment of the present invention having the above-mentioned structure is described. FIG. 9 shows signal waveforms obtained at the individual sections during operation with a relatively long time range. In response to the reproduced digital signal x of which amplitude is fluctuated, the amplitude fluctuation amount detector 45 detects the fluctuation amount of the amplitude to produce an amplitude control signal indicative of the ideal gain g. The gain g is used to control the gain of the multiplier 41 in the stage before the maximum likelihood detector 42. As a result, the input gx of the maximum likelihood detector 42 has the same large waveform as the one in the case where the reproduced digital signal x has no amplitude fluctuation.

Figure 10:
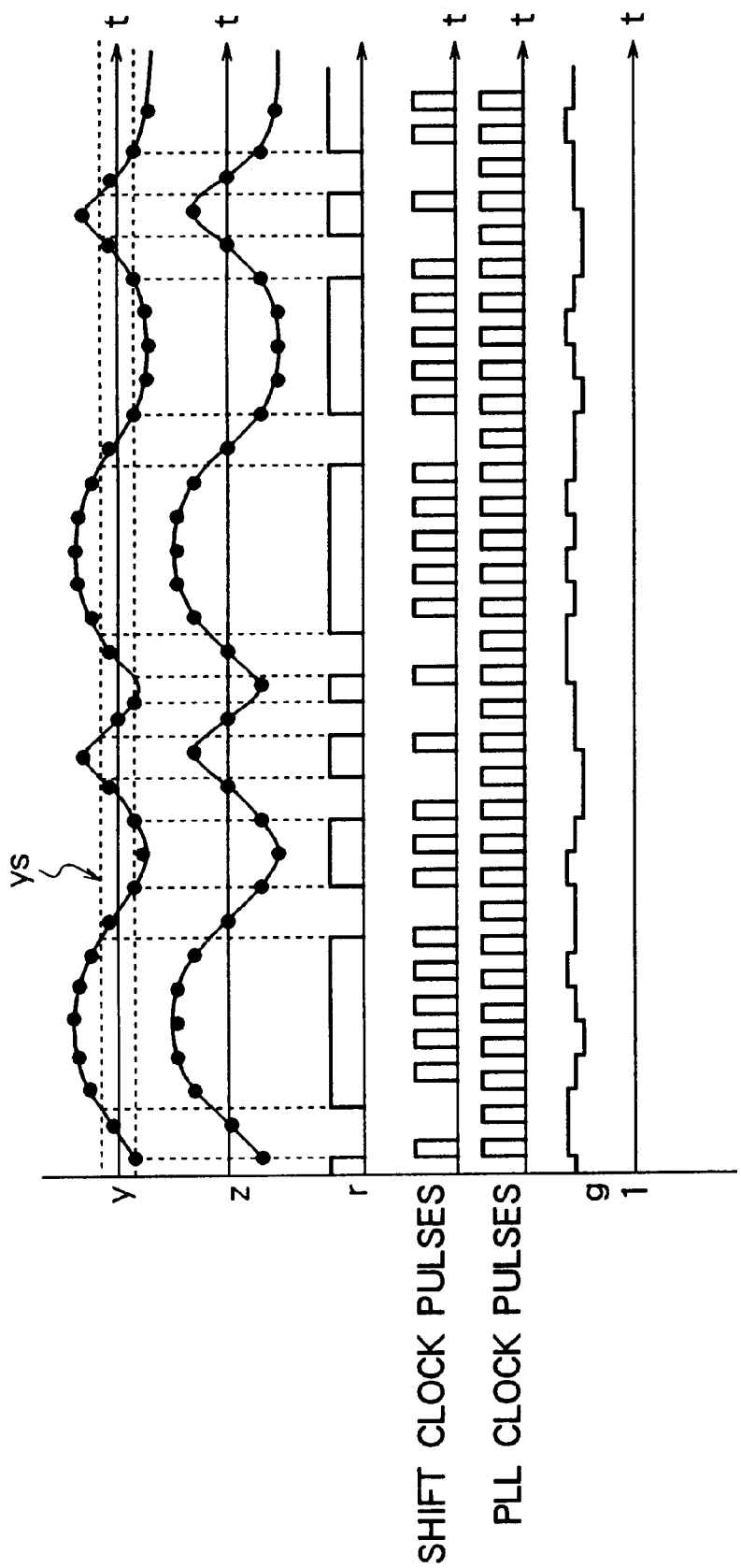
FIG. 10 is a view showing signal waveforms at individual sections for use in describing operation of an amplitude fluctuation amount detection section illustrated in FIG.7.
Figure 11:
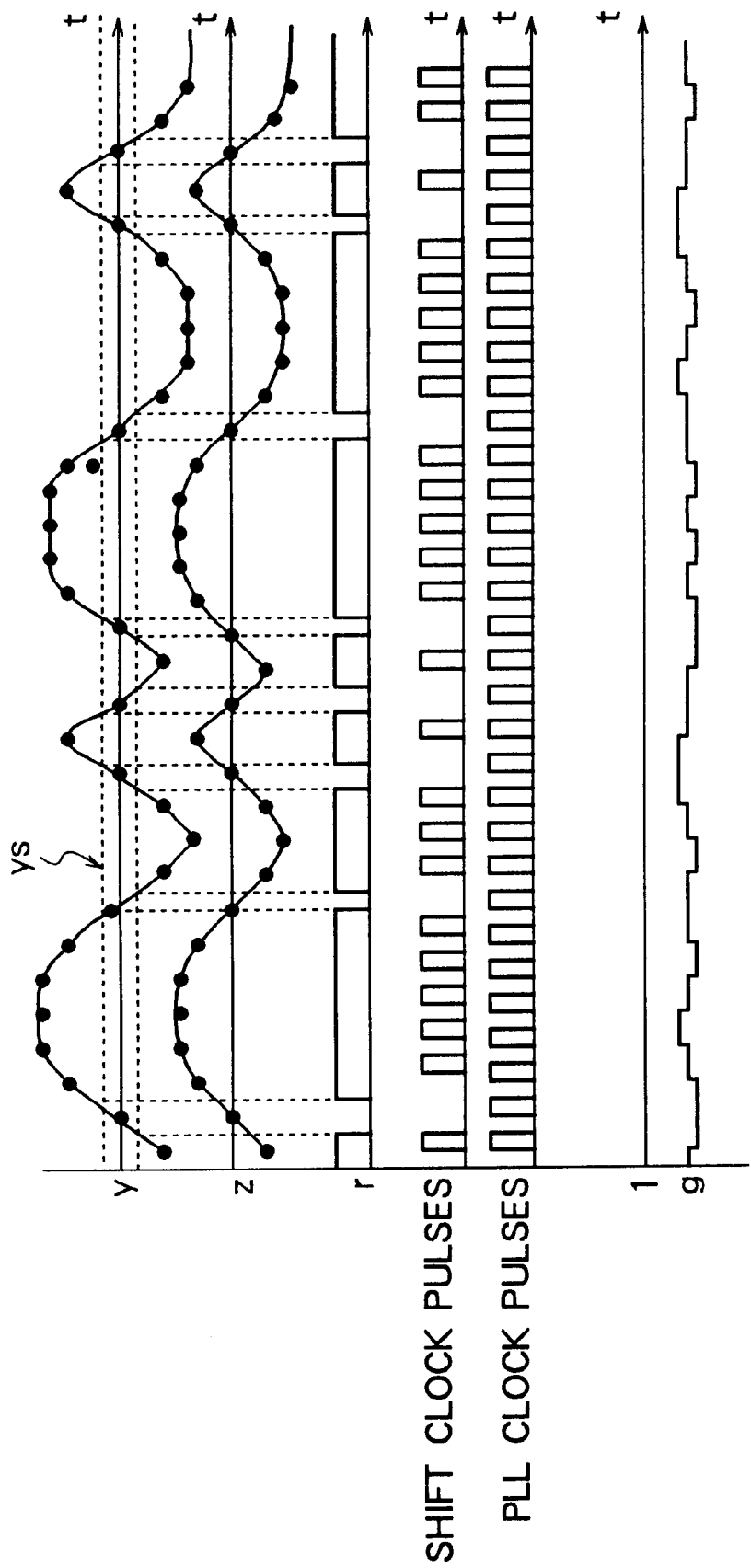
FIG. 11 is a view showing signal waveforms at individual sections for use in describing operation of the amplitude fluctuation amount detection section illustrated in FIG. 7.

FIGS. 10 and 11 show signal waveforms at the individual sections during operation of the amplitude fluctuation amount detector 45 in the first embodiment of the present invention. FIG. 10 represents a case where the reproduced digital signal x has a low level of amplitude while FIG. 11 represents a case where the reproduced digital signal x has a high level of amplitude.

In FIG. 10, the waveform and the amplitude information z of the delayed signal y are the same in phase and different in amplitude. The absolute value of the delayed signal y is level-detected with a threshold value ys, which generates the logic signal r (FIG. 7) that is at a low level when the amplitude is close to zero. The shift clock pulse can be generated by means of passing the logic signal r and the PLL clock pulses of the regenerative signal x through the gate. The shift clock pulse is used to make the n number of registers 47 illustrated in FIG. 8 operate in a synchronous manner to generate the amplitude control signal indicative of the gain g. In this event, the gain g is equal to or larger than 1. On the contrary, the gain g is equal to or smaller than 1 in the case of FIG. 11.

Figure 12:
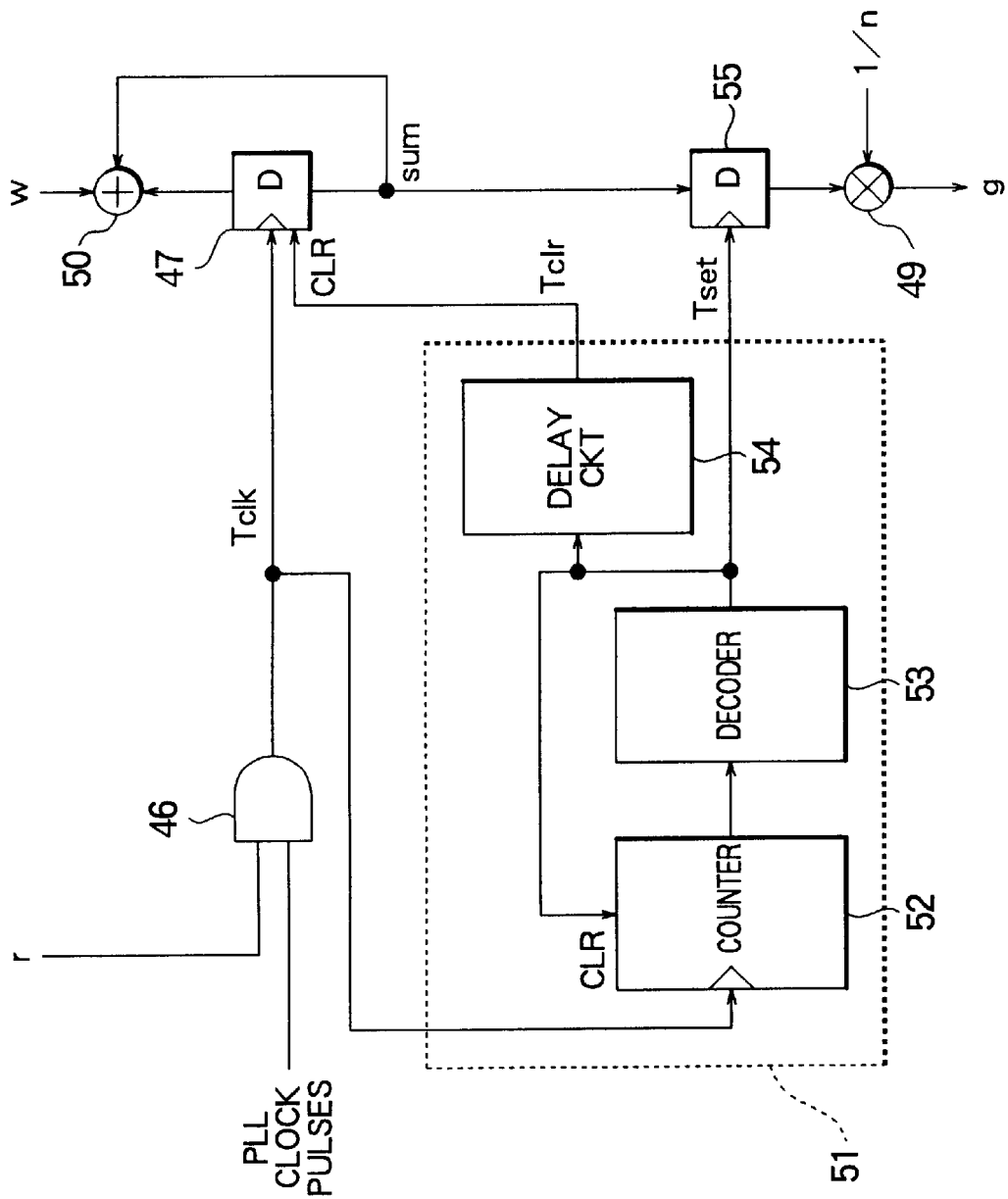
FIG. 12 is a block diagram showing a second example of the equalization circuit illustrated in FIG. 7.

Referring to FIG. 12, another example of the equalization circuit 45-2 illustrated in FIG. 8 is described. The equalization circuit 45-2 in FIG. 8 requires a number of registers 47 when it is required to increase the number of samples to be summed in order to increase the SNR of the average value of the division results w. This means that the equalization circuit 45-2 becomes large in scale.

The equalization circuit shown in FIG. 12 is for preventing the problem of a larger circuit scale. In FIG. 12, the components and parts similar to those illustrated in FIG. 7 are represented by the same reference numerals as FIG. 7. The signal r and the PLL clock pulses are supplied to the AND gate 46. In response to this, the AND gate 46 produces a PLL clock pulse Tclk only when the signal r is "high". The division result w is added to the content of the register 47 at a timing when the PLL clock pulse Tclk supplied from the AND gate 46 changes. This means integration is achieved. A timing circuit 51 produces a set signal Tset. The set signal Tset is used for counting the n number of PLL clock pulse Tclk supplied from the AND gate 46. A register 55 holds an integral value sum of the register 47 when it receives the set signal Tset. The timing circuit 51 then generates a clear signal Tclr to reset the register 47. An output of the register 55 is multiplied by ½ in a multiplier 49. An average value of the n number of gain sample values is calculated to produce the gain g.

The timing circuit 51 comprises a counter 52, a decoder circuit 53, and a delay circuit 54. The counter 52 is for counting the number of the PLL clock pulse Tclk. The decoder circuit 53 is for decoding the counted value obtained by the counter 52. The delay circuit 54 is for timing the set signal Tset and the clear signal Tclr.

Figure 13:
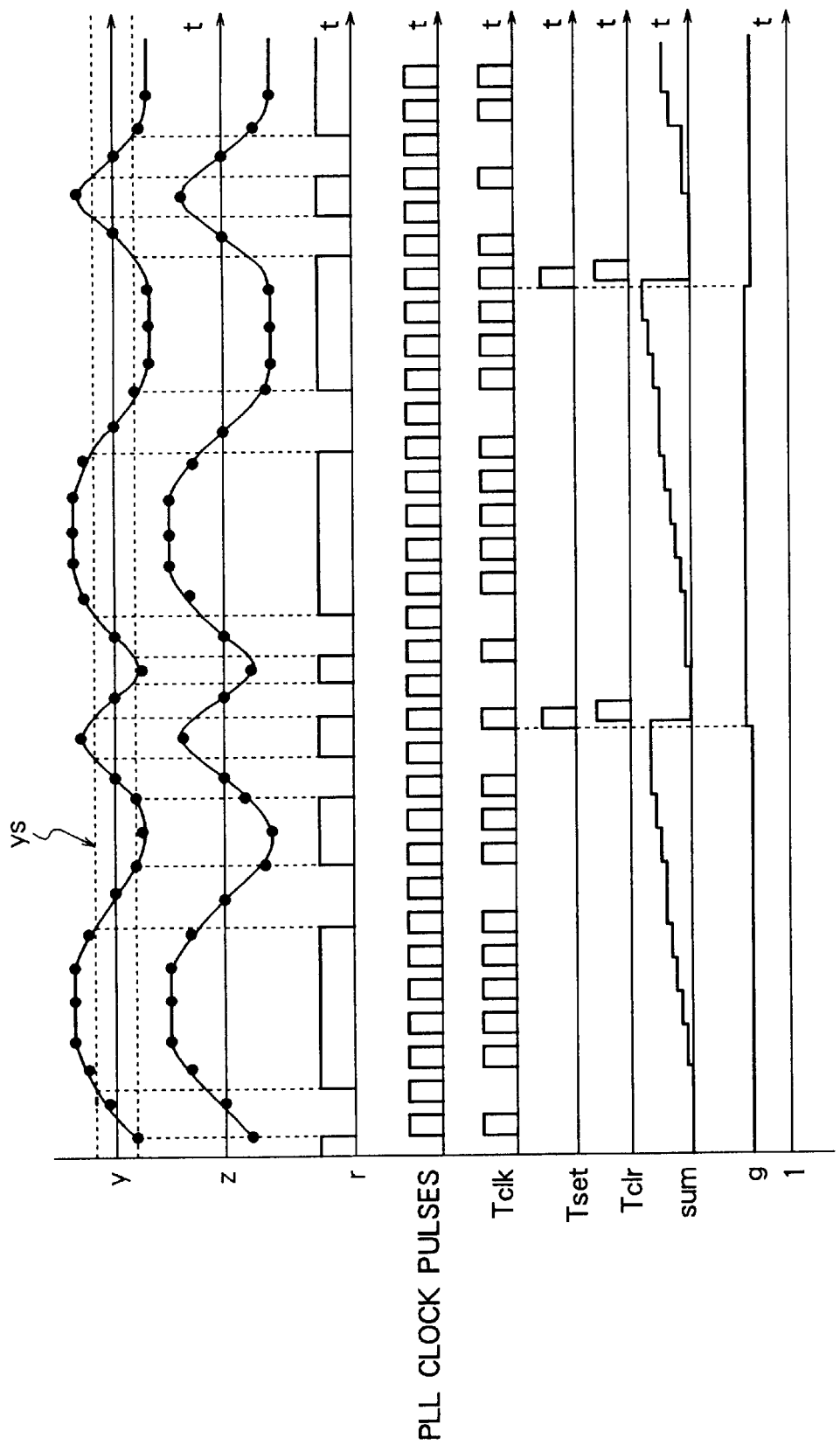
FIG. 13 is a view showing signal waveforms at individual sections for use in describing operation of the amplitude fluctuation amount detection section using the equalization circuit illustrated in FIG. 12.

Next, operation of the equalization circuit in FIG. 12 is described with reference to FIG. 13. FIG. 13 is similar to FIG. 7 about that the signal r and the PLL clock pulse are supplied to the AND gate 46. The gain sample value, i.e., the division result w is integrated in the register 47. The set signal Tset is first generated when the counted number of the PLL clock pulse Tclk from the AND gate 46 reaches n. An integral value sum obtained in the register 47 is held by the register 55. The clear signal Tclr is generated after the holding to set "0" to the register 47. The output of the register 47 is increased or decreased stepwise and the register 47 is cleared at each time of the clear signal Tclr when the reproduced digital signal x has a fluctuated amplitude.

Figure 14:
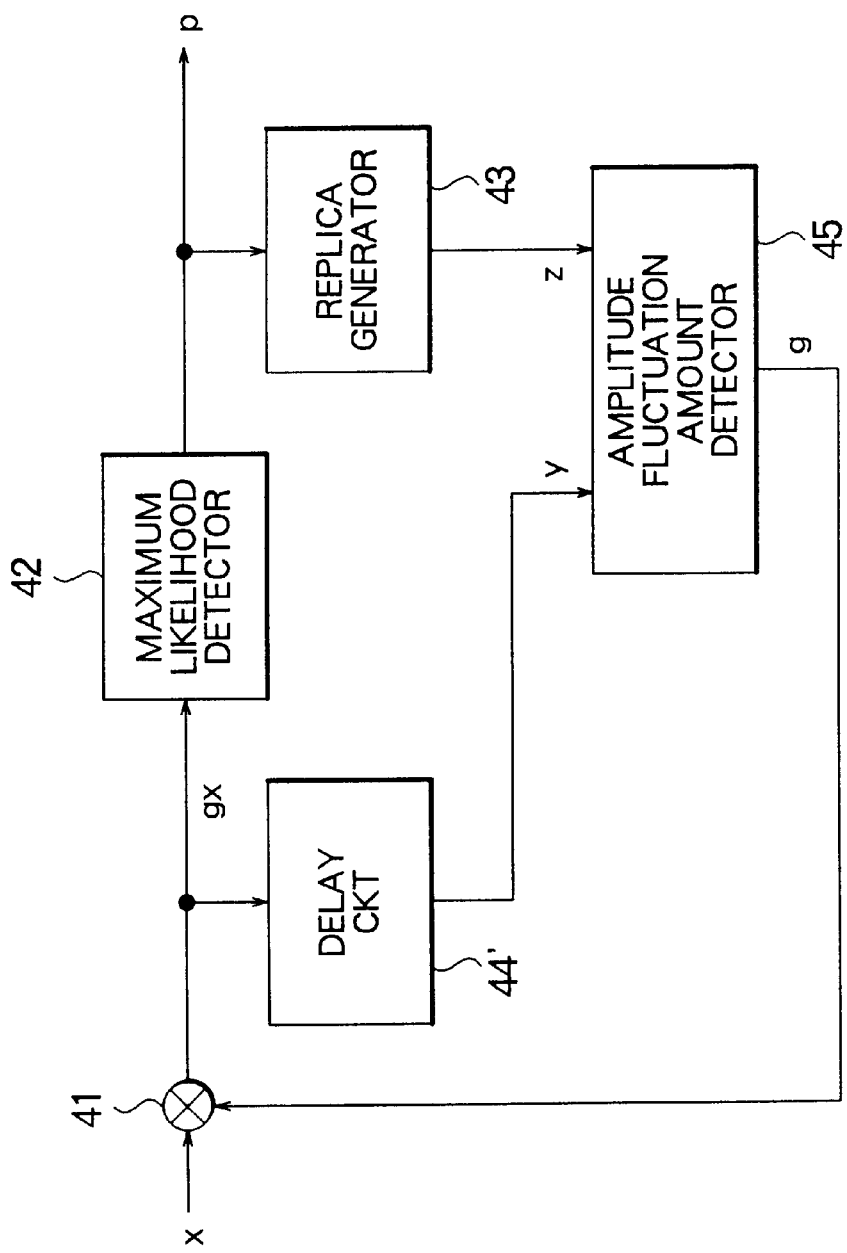
FIG. 14 is a block diagram showing an information detecting device according to a second embodiment of the present invention.

Next, an information detecting device according to a second embodiment of the present invention is described with reference to FIG. 14. In FIG. 14, similar components and parts are represented by like reference numerals to FIG. 4. In the second embodiment, a delayed signal y is produced by a delay circuit 44' in response to the output of the multiplier 41. The delayed signal y has the same phase as the amplitude information z supplied from the replica generator 43. More specifically, the reproduced digital signal x read out of the optical disk medium is amplified by g times by the multiplier 41 and is then supplied to the maximum likelihood detector 42. The maximum likelihood detector 42 carries out pulsing operation based on the reproduced digital signal x and produces the pulse string p indicative of the bit information. The pulse string p is converted into an ideal amplitude information z indicative of a replica waveform by the replica generator 43. The amplitude fluctuation amount detector 45 detects a fluctuation amount of the amplitude by means of comparing the amplitude information z and the delayed signal y supplied by the delay circuit 44'. As mentioned above, the delay circuit 44' is used for matching the phase of the output gx of the multiplier 41 and the phase of the amplitude information z. A delay time in the delay circuit 44' is determined uniquely depending on the amount of delay caused due to the maximum likelihood detector 42 and the replica generator 43. The amplitude fluctuation amount detector 45 detects a fluctuation amount of the waveform of the reproduced digital signal x according to the delayed signal y and the amplitude information z. The amplitude fluctuation amount detector 45 feeds the ideal gain g back to the multiplier 41. This permits AGC operation.

Figure 15:
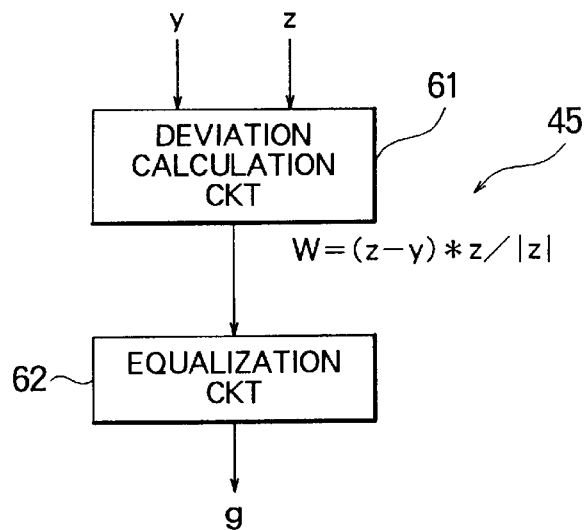
FIG. 15 is a block diagram showing the structure of an amplitude fluctuation amount detection section illustrated in FIG. 14.

Referring to FIG. 15, the second example of the amplitude fluctuation amount detector 45 is described. In FIG. 15, the amplitude fluctuation amount detector 45 comprises a deviation calculation circuit 61 and an equalization circuit 62. The deviation calculation circuit 61 calculates $(z-y)*z/|z|$ from the delayed signal y and the amplitude information z that have the same phase. The deviations calculated by the deviation calculation circuit 61 are equalized by the equalization circuit 62 to modify the gain g of the AGC amplifier.

Figure 16:
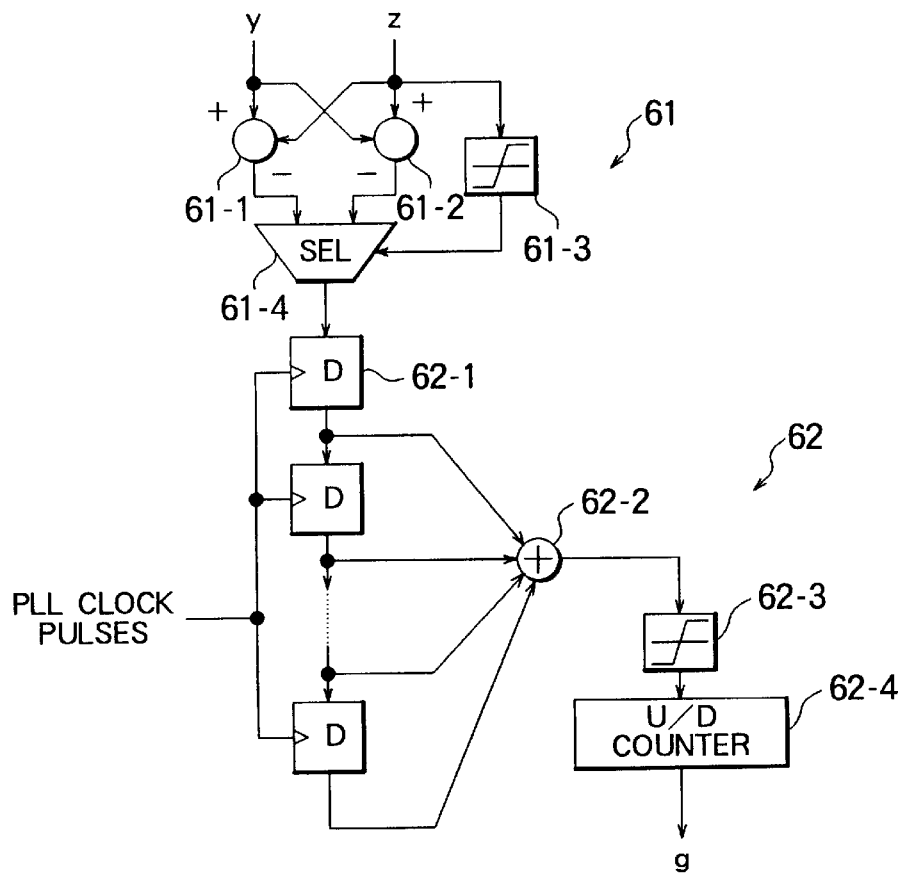
FIG. 16 is a block diagram showing the structure in detail of the amplitude fluctuation amount detection section illustrated in FIG. 15.

Referring to FIG. 16, the structure of the second example of the amplitude fluctuation amount detector 45 is described in detail. The deviation calculation circuit 61 comprises two subtracters 61-1 and 61-2 for calculating $(z-y)$ and $(y-z)$, respectively, to obtain $(z-y)*z/|z|$. A level detector 61-3 detects whether the amplitude information z is positive or negative. The selector 61-4 selects either one of $(z-y)$ and $(y-z)$ and produces the selected one, based on the detected result obtained by the level detector 61-3.

The equalization circuit 62 comprises a number of registers 62-1, an adder 62-2, a level detector 62-3, and an up/down counter 62-4. The value supplied from the selector 61-4 is transmitted to the adjacent next stage each time when the PLL clock pulse is received by the register 62-1. The outputs of the registers 62-1 are summed by the adder 62-2. The level detector 62-3 detects whether the addition result obtained by the adder 62-2 is positive or negative. When the addition result is positive, the level detector 62-3 increments the up/down counter 62-4. On the contrary, when the addition result is negative, the level detector 62-3 decrements the up/down counter 62-4. The gain g of the AGC amplifier modified in the above-mentioned manner. This circuit provides a circuit having a smaller scale because neither the division circuit nor the circuit for avoiding distribution of the division results is required.

Figure 17:
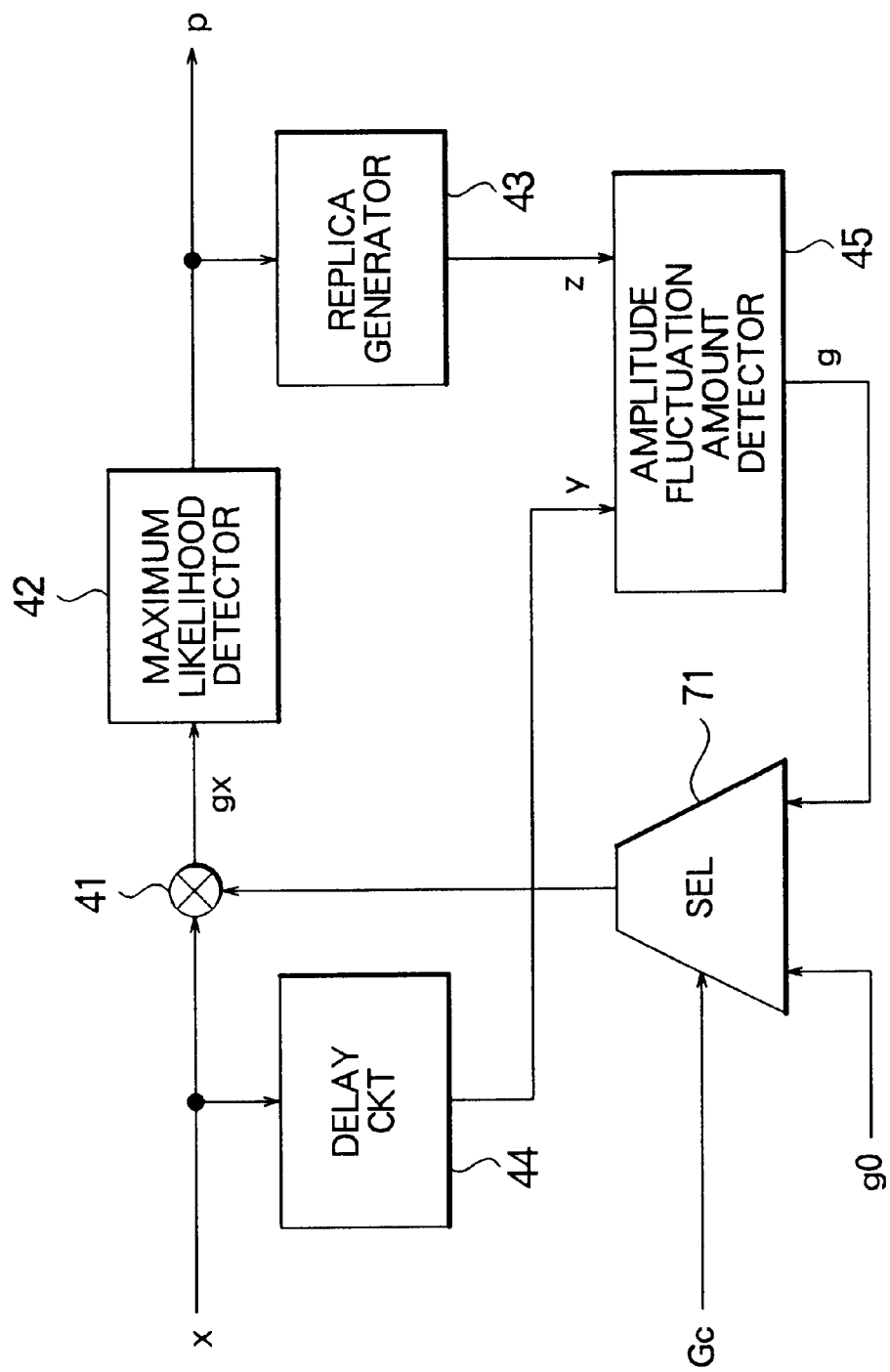

An information detecting device according to a third embodiment of the present invention is described with reference to FIG. 17. In FIG. 17, equivalent components and parts to FIG. 4 are depicted by like reference numerals. In this embodiment, a selector 71 is added to the circuit in FIG. 4 in order to switch the gain g of the AGC amplifier in response to a gain control signal Sgc supplied from a system controller (not shown). The selector 71 is in a fixed mode for setting, in response to the gain control signal Sgc, the gain g to an initial value g0 when the reproduced digital signal x is not received. This is made to prevent the gain g of the AGC amplifier from being distributed or becoming zero. On the other hand, when the reproduced digital signal x is received, the selector 71 is switched to a follow-up mode to produce the gain g from the amplitude fluctuation amount detector 45 to the multiplier 41.

Figure 18:
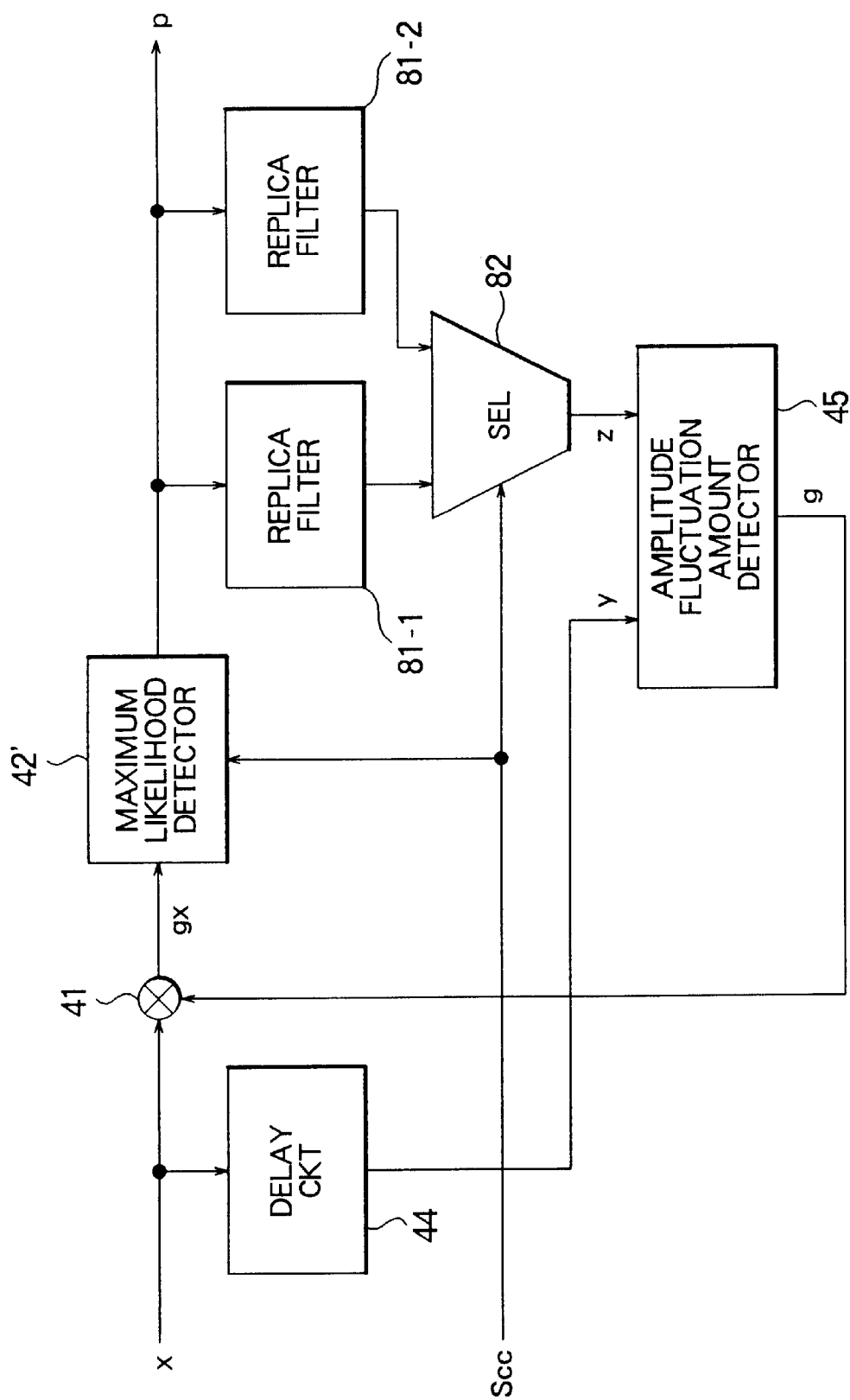
FIG. 18 is a block diagram showing the structure of an information detecting device according to a third embodiment of the present invention.
Figure 19:
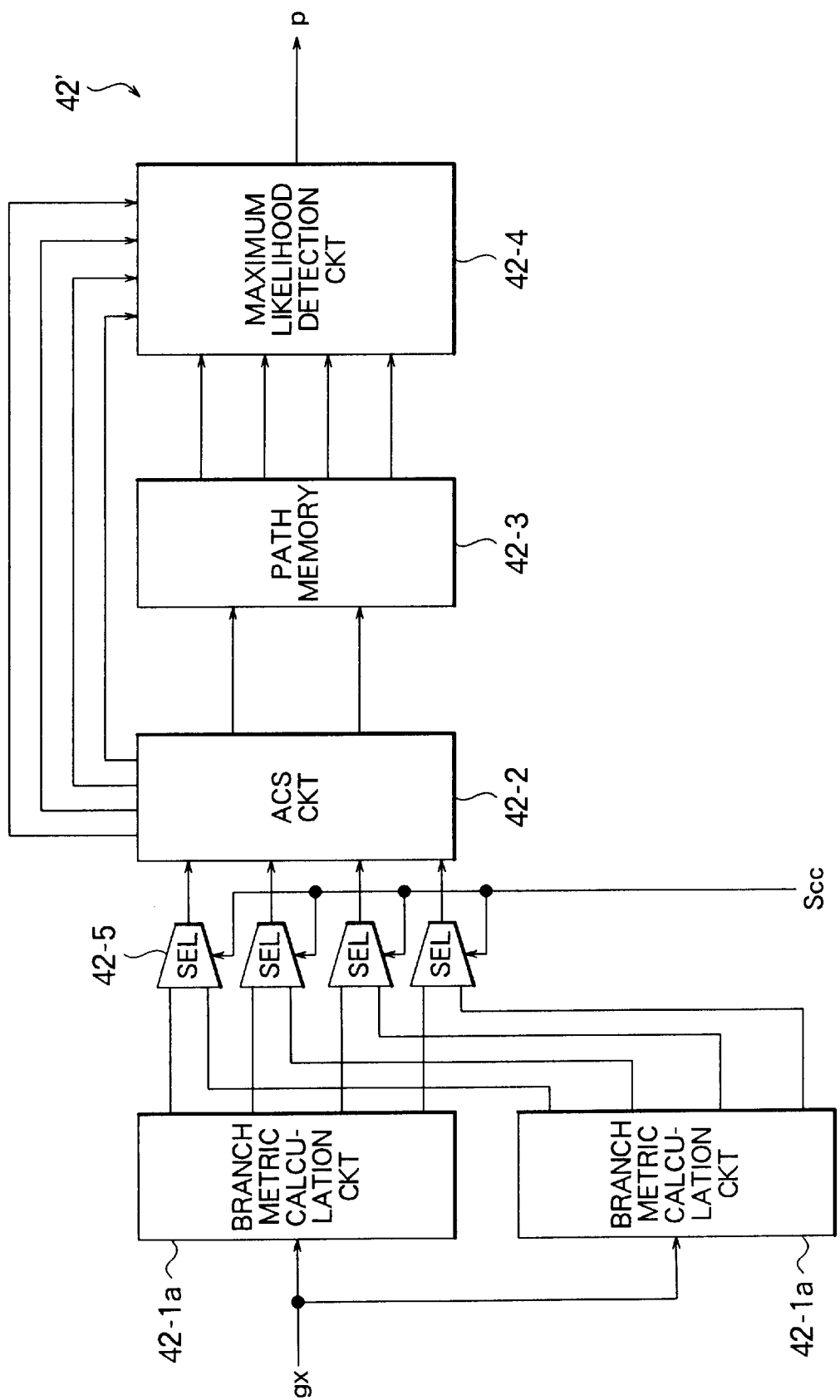
FIG. 19 is a block diagram showing the structure of a maximum likelihood detection section illustrated in FIG. 18.

An information detecting device according to a fourth embodiment of the present invention is described with reference to FIGS. 18 and 19. In FIGS. 18 and 19, equivalent components and parts to FIGS. 4 and 5, respectively, are depicted by like reference numerals. The embodiment in FIG. 18 comprises two replica filters 81-1 and 81-2 that are for two different reproduction channels, respectively. Each of the replica filters 81-1 and 81-2 produces the amplitude information z of the corresponding reproduction channels according to the pulse string supplied from the maximum likelihood detector 42. The selector 82 changes the outputs of the replica filters 81-1 and 81-2 in response to a reproduction channel switching signal Scc supplied from the system controller (not shown) to produce the selected one to the amplitude information detector 45.

In FIG. 19, the maximum likelihood detector 42 comprises two branch metric calculation circuits 42-1a and 42-1b and a plurality of selectors 42-5 in addition to the components described in conjunction with FIG. 5. The selectors 42-5 switches and produces branch metric calculated values obtained by the branch metric calculation circuits 42-1a and 42-1b by the reproduction channel switching signal Scc from the system controller. The branch metric calculated values supplied from the selectors 42-5 are pulsed through the ACS circuit 42-2, the path memory 42-3, and the maximum likelihood determination circuit 42-4.

The present invention can be applied when the number of the replica filters and the branch metric calculation circuits is three or more. The above-mentioned configuration makes it possible to comply with a system having a number of reproduction channels, without any significant increase of the circuits.

According to the present invention described above, the following effects are obtained. The first effect is that the input amplitude of the maximum likelihood detector can be controlled automatically. This is because the gain is determined with the channel properties of the reproduced digital signal being taken into consideration, rather than referring the amplitude envelope alone as in the common AGC circuits.

The second effect is that the information detecting device may be formed of a maximum likelihood detector having a relatively small circuit scale for a fixed channel. This is because the input to the maximum likelihood detector is corrected and no channel properties thereof is changed.

The third effect is that a common AGC circuit is not required. This is because the equivalent function to the physical AGC circuit is achieved digitally in the information detecting device of the present invention.

What is claimed is:

1. An information detecting device characterized by comprising:

a multiplier for multiplying a gain g by a reproduced digital signal reproduced out of an optical recording medium to produce a multiplication result;

maximum likelihood detection means for use in carrying out, in response to the multiplication result, pulsing operation according to the multiplication result to produce a pulse string;

replica generating means for use in producing, in response to the pulse string, a replica waveform having an ideal channel property out of the pulse string;

a delay circuit for use in producing, in response to the reproduced digital signal, a delayed signal having the same phase as the replica waveform; and amplitude fluctuation amount detection means for detecting, in response to the replica waveform and the delayed signal, a fluctuation amount of the amplitude of the reproduced digital signal by means of comparing the replica waveform with the delayed signal and supplies a signal designating the gain g to the multiplier in accordance with a detected fluctuation amount.

2. An information detecting device as claimed in claim 1, characterized in that said amplitude fluctuation amount detection means comprises:

a divider for use in calculating a ratio of the delayed signal to the replica waveform, the divider producing a division result;

equalization means for equalizing the division result to produce an equalized value as a signal designating the gain g; and a level detector for detecting an absolute value of the delayed signal to produce a detection signal only when a detected absolute value exceeds a predetermined value, said equalization means equalizing the division result only when it receives the detection signal.

3. An information detecting device as claimed in claim 2, characterized in that said equalization means comprises:

shift clock generating means for generating a shift clock pulse by means of ANDing PLL clock pulses and the detected signal;

n stages of shift registers connected in series with each other to carry out shifting operation in response to the shift clock pulse, the shift register at the fist stage being adapted to receive the division result;

an adder for use in calculating a sum of the n stages of the shift registers to produce an addition result; and a multiplier for multiplying the addition result by 1/n to produce a multiplication result as a signal designating the gain g.

4. An information detecting device as claimed in claim 2, characterized in that said equalization means comprises:

shift clock generating means for generating a shift clock pulse by means of ANDing PLL clock pulses and the detected signal;

an integrator having a reset function to be operated in response to a clear signal, the integrator being for integrating the division result in synchronism with the shift clock pulse to produce an integration result;

a register for use in latching the integration result in response to a latch signal;

a multiplier for multiplying the output of the register by 1/n to produce a multiplication result as a signal designating the gain g; and a timing generating circuit that produces, in response to the shift clock pulse, the latch signal each time when the n number of shift clock pulse are counted and then produces the clear signal.

5. An information detecting device as claimed in any one of claims 1 through 4, characterized by further comprising gain switching means connected between said amplitude fluctuation amount detecting means and said multiplier, said gain switching means selecting and producing a predetermined initial value g0 as the gain g when there is no reproduced digital signal, while producing a signal designating the gain g supplied from said amplitude fluctuation amount detecting means when there is the reproduced digital signal.

6. An information detecting device as claimed in claim 5, characterized in that a Viterbi detector is used as said maximum likelihood detecting means.

7. An information detecting device as claimed in claim 6, characterized in that a transversal filter is used as said replica generating means.

8. An information detecting device characterized by comprising:
- a multiplier for multiplying a gain g by a reproduced digital signal reproduced out of an optical recording medium to produce a multiplication result;
- maximum likelihood detection means for use in carrying out, in response to the multiplication result, pulsing operation according to the multiplication result to produce a pulse string;
- replica generating means for use in producing, in response to the pulse string, a replica waveform having an ideal channel property out of the pulse string;
- a delay circuit for use in producing, in response to the multiplication result, a delayed signal having the same phase as the replica waveform; and
- amplitude fluctuation amount detection means for detecting, in response to the replica waveform and the delayed signal, a fluctuation amount of the amplitude of the reproduced digital signal by means of comparing the replica waveform with of the delayed signal and supplies a signal designating the gain g to the multiplier in accordance with a detected fluctuation amount.

9. An information detecting device as claimed in claim 8, characterized in that said amplitude fluctuation amount detecting means comprises:
- deviation calculating means for calculating $(z-y)*z/|z|$ from the replica waveform and the delayed signal; and
- equalization means for equalizing the output of said deviation calculating means to produce the equalized value as a signal designating the gain g.

10. An information detecting device as claimed in claim 9, characterized in that said deviation calculating means comprises:
- first subtracting means for use in calculating $(z-y)$ from the replica waveform and the delayed signal;
- second subtracting means for use in calculating $(y-z)$ from the replica waveform and the delayed signal;
- a first level detector for use in detecting a polarity of the replica waveform to produce a first detection result; and
- a selector for selecting one of the outputs of said first subtracting means and said second subtracting means according to the first detection result to produce a selection result, said equalization means comprising:
- a plurality of shift registers connected in series with each other to carry out shifting operation in response to PLL clock pulses, the shift register at the fist stage being adapted to receive the selection result;
- an adder for use in calculating a sum of the shift registers to produce an addition result;
- a second level detector for use in detecting a polarity of the addition result to produce a second detection result; and
- an up/down counter for counting up the addition result when it is positive while counting down the addition result when it is negative in response to the second detection result to produce a counted value as a signal designating the gain g.

11. An information detecting device as claimed in any one of claims 8 through 10, characterized by further comprising gain switching means connected between said amplitude fluctuation amount detecting means and said multiplier, said gain switching means selecting and producing a predetermined initial value g0 as the gain g when there is no reproduced digital signal, while producing a signal designating the gain g supplied from said amplitude fluctuation amount detecting means when there is the reproduced digital signal.

12. An information detecting device as claimed in claim 11, characterized in that a Viterbi detector is used as said maximum likelihood detecting means.

13. An information detecting device as claimed in claims 12, characterized in that a transversal filter is used as said replica generating means.

14. An information detecting device characterized by comprising:
- a multiplier for multiplying a gain g by a reproduced digital signal reproduced out of an optical recording medium to produce a multiplication result;
- maximum likelihood detection means for use in carrying out, in response to the multiplication result, pulsing operation according to the multiplication result to produce a pulse string, said maximum likelihood detection means being capable of switching channel properties;
- replica generating means for use in producing, in response to the pulse string, a replica waveform having an ideal channel property out of the pulse string, said replica generating means being capable of switching channel properties;
- a delay circuit for use in producing, in response to the reproduced digital signal, a delayed signal having the same phase as the replica waveform; and
- amplitude fluctuation amount detection means for detecting, in response to the replica waveform and the delayed signal, a fluctuation amount of the amplitude of the reproduced digital signal by means of comparing the replica waveform with the delayed signal and supplies a signal designating the gain g to the multiplier in accordance with a detected fluctuation amount,
- said maximum likelihood detection means and the replica generating means being capable of changing the channel properties at the same time by a control signal from a system controller.

15. An information detecting device as claimed in claim 14, characterized in that said amplitude fluctuation amount detection means comprises:
- a divider for use in calculating a ratio of the delayed signal to the replica waveform;
- equalization means for equalizing the division result to produce an equalized value as a signal designating the gain g; and
- a level detector for detecting an absolute value of the delayed signal to produce a detection signal only when the detected absolute value exceeds a predetermined value, said equalization means equalizing the division result only when it receives the detection signal.

16. An information detecting device as claimed in claim 15, characterized in that said equalization means comprises:
- shift clock generating means for generating a shift clock pulse by means of ANDing PLL clock pulses and the detected signal;
- n stage s of shift registers connected in series with each other to carry out shifting operation in response to the shift clock pulse, the shift register at the fist stage being adapted to receive the division result;
- an adder for use in calculating a sum of the n stages of the shift registers to produce an addition result; and a multiplier for multiplying the addition result by 1/n to produce a multiplication result as a signal designating the gain g.

17. An information detecting device as claimed in claim 16, characterized in that said equalization means comprises:

shift clock generating means for generating a shift clock pulse by means of ANDing PLL clock pulses and the detected signal;

an integrator having a reset function to be operated in response to a clear signal, the integrator being for integrating the division result in synchronism with the shift clock pulse to produce an integration result;

a register for use in latching the integration result in response to a latch signal;

a multiplier for multiplying the output of the register by 1/n to produce a multiplication result as a signal designating the gain g; and a timing generating circuit that produces, in response to the shift clock pulse, the latch signal each time when the n number of shift clock pulse are counted and then produces the clear signal.

* * * * *